April 28, 1931.   V. H. WIZIARDE ET AL   1,803,084
BASKET COVER FASTENER
Filed May 28, 1928
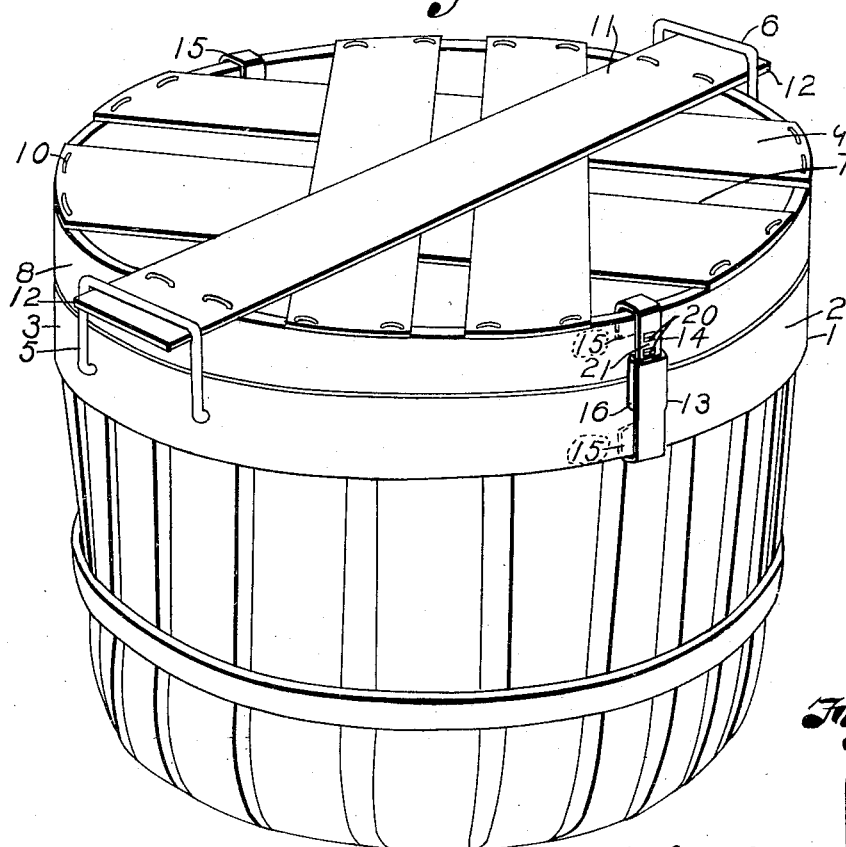
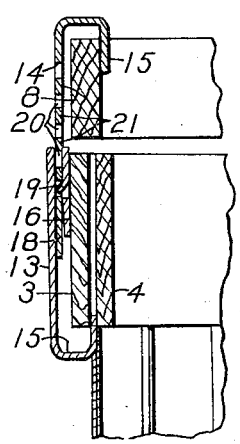
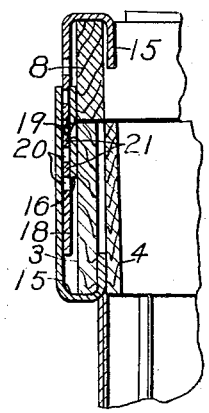
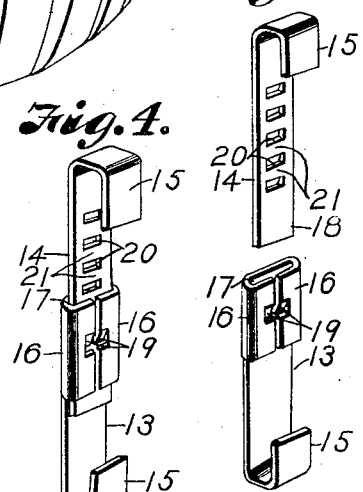
INVENTORS
Victor H. Wiziarde
and Charles H. Bacher.
BY Arthur G. Brown
ATTORNEY.

Patented Apr. 28, 1931

1,803,084

UNITED STATES PATENT OFFICE

VICTOR H. WIZIARDE AND CHARLES H. BACHER, OF ST. JOSEPH, MISSOURI

BASKET-COVER FASTENER

Application filed May 28, 1928. Serial No. 281,248.

Our invention relates to fasteners and more particularly to devices of that character for fastening the cover on a container, such as a fruit basket, the principal objects of the invention being to apply a fastener manually while the cover is pressed on the basket, to latch the fastener securely against accidental disturbance and to require destruction of the fasteners for removal of a securely latched cover.

In accomplishing these and other objects of the invention we have provided improved details of structure, the preferred forms of which are illustrated in the accompanying drawings, wherein:

Fig. 1 is a perspective view of a basket and cover fastened thereto by our invention.

Fig. 2 is a fragmentary vertical sectional view of a portion of the basket and cover illustrating the cover in spaced relation with the basket and the members of the device in position for moving to cover-fastening position.

Fig. 3 is a similar view illustrating the device in cover fastening position.

Fig. 4 is a slightly enlarged perspective view of the fastener in latching position.

Fig. 5 is a similar view of the members separated.

Referring in detail to the drawings:

1 designates a fruit basket of ordinary splint construction having a rim 2 composed of outer and inner hoops 3 and 4, and provided with opposite bails 5 and 6. 7 designates a cover comprising a hoop 8 and splints or slats 9 secured to the hoop by staples 10. An elongated slat 11 has ends 12 extending beyond the cover hoop to engage under the basket bails to latch the cover on the basket. The cover slat 11 serves to retain the cover for temporary protection of contents but for shipping purposes, further means are required to securely attach the cover to the basket. Furthermore when the basket is packed, the fruit projects above the mouth of the basket and the cover is bowed over the protruding fruit to engage the latching slat with the bails and any attaching means requiring the application of tacks, such as for applying the tin strips usually employed for fastening the cover, would tend to bruise the contained fruit.

Our improved fastening device may be applied manually and without further pressure or disturbance of the fruit than is required for bringing the cover hoop into engagement with the basket hoop.

The device comprises a pair of cooperating hoop hook members 13 and 14, each having a hook 15 at one end for engagement over a hoop and being provided with ratchet-like means presently described whereby they are inter-engaged and latched in cover-fastening position.

The basket rim engaging member 13 is provided with lateral wings 16 inbent in spaced relation with the body thereof to comprise a sleeve or loop portion 17 adapted to receive the unhooked and straight end 18 of the opposite member 14 for retaining and guiding the cover hook member. The ratchet means preferably comprises instruck fingers 19 extending downwardly and inwardly of the sleeve 17 and providing resilient latches slidable over the member 14, and into recesses such as slots or notches 20 provided in the member 14. The resilient fingers, while free to pass out of the notches and over the portions 21 of the member 14 while the two members are being moved toward each other, will automatically seat on a lower wall 21 and thereby latch the two members together against sliding removal, the sleeve retaining the members in latching position.

In using the device the cover is applied to the basket and the cross slat latched under the bails in the usual manner.

The complementary members of a device are then applied to adjacent portions of the cover hoop and the basket rim, the cover hook being supported from the cover hoop and the basket hook being frictionally engaged and supported between the two hoop members of the basket rim, and the end 18 of the cover hook being in position for insertion into the sleeve of the basket hook.

The portion of the cover adjacent the device is pressed into engagement with the basket rim and the cover hook is moved through the sleeve of the basket hoop, the fingers of the operator retaining the two members in engagement. The latching fingers of the basket hook sleeve will slide over the straight portion of the cover hook and into the notches thereof successively until the hooks 15 are closely engaged with the respective hoops. The latching fingers will at such point be retained against separation of the hook members by the downward inclination of the fingers which bear against the lower wall 21 of the notch and prevent withdrawal of the cover hook from the basket hook.

A plurality of the devices are preferably used in fastening a cover on the basket.

When it is desired to remove the cover, the fastening devices may be distorted or broken since they are locked in engagement with each other and the fingers cannot be slipped from the notches.

Fig. 2 illustrates the latching position of the fastener when the hoop of the cover may not be brought into close engagement with the basket rim; for example, when the fruit is first packed. Settling or other cause may render desirable the tightening of the fastening devices and the pressing of the cover more tightly on the basket; and Fig. 3 illustrates the manner in which the fasteners are adapted to be adjusted to the new condition, pressure by the operator causing the cover member to slide further through the sleeve of the basket hook and engage the resilient fingers with a notch further along on the cover hook member.

The device as described is, therefore, not only adapted for use on containers having rims and cover hoops of varying widths and diameters, but for adjustment to varying spacings of container and cover members under different conditions. While the device has been illustrated and described as applied to a fruit basket, it is apparent that it may be applied to any container having a rim portion such as a hoop to receive one hook and a cover provided with a hook-receiving portion such as a hoop.

What we claim and desire to secure by Letters Patent is:

1. In a basket cover fastener, a metallic body having a hook at one end and a series of transverse notches and a second body having a hook at one end and integral lateral wings bent back over the body to form a sleeve for receiving the unhooked end of the first named body and having instruck fingers on the edges of said wings adapted to engage one face of the first named body and tending to enter said notches to latch the bodies together against longitudinal movement thereof away from each other.

2. In a basket cover fastener, a metallic body having a hook at one end and a series of transverse notches, a second body having a hook at one end and an integral lateral wing bent back over the body to form a sleeve for receiving the unhooked end of the first named body, and an instruck finger on said wing adapted to engage one face of the first named body and tending to enter said notches to latch the bodies together against longitudinal movement thereof away from each other.

In testimony whereof we affix our signatures.

VICTOR H. WIZIARDE.
CHARLES H. BACHER.